Patented Mar. 14, 1950

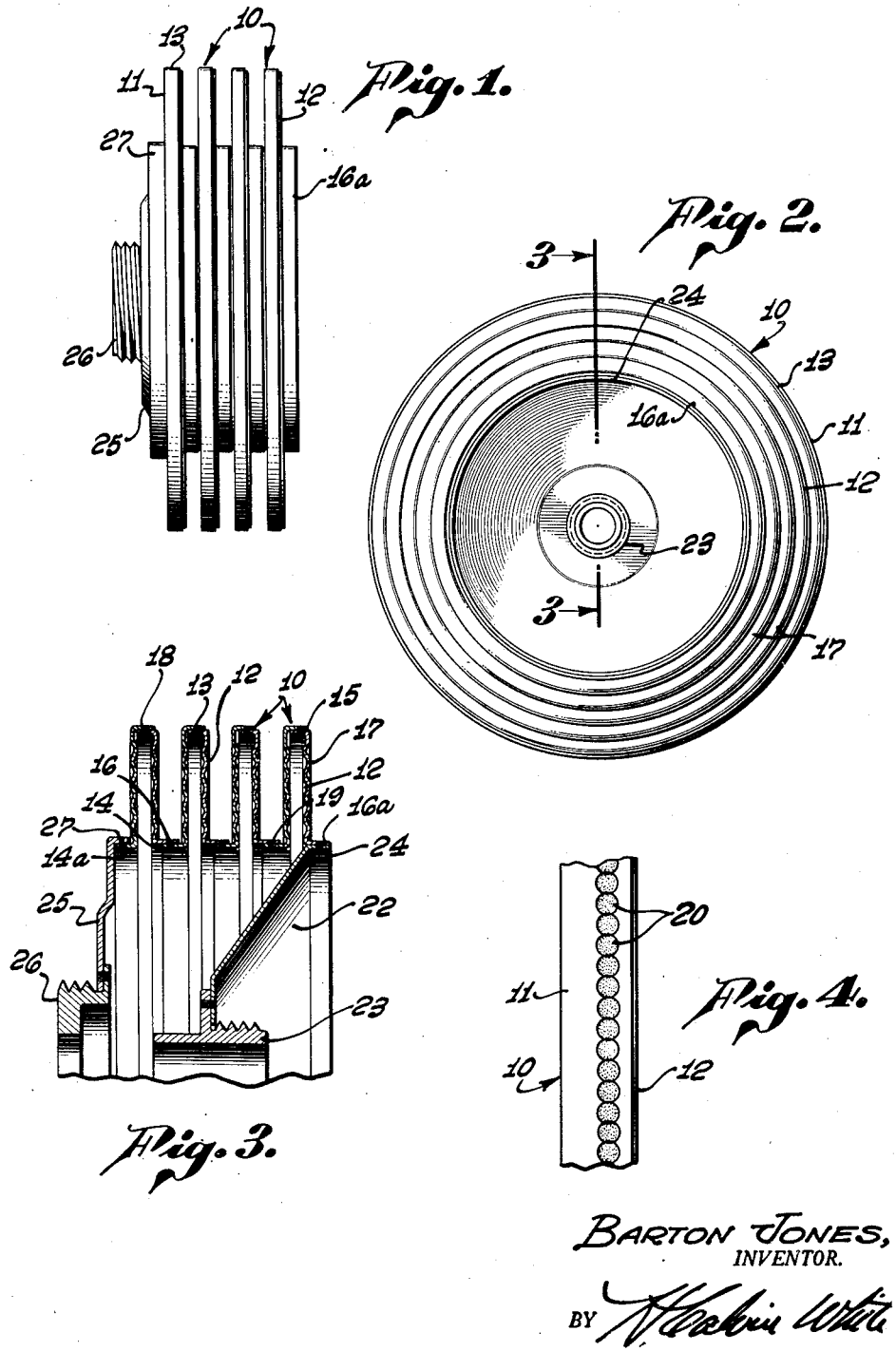
March 14, 1950  B. JONES  2,500,360
PRESSURE RESPONSIVE BELLOWS
Filed Sept. 7, 1948
Barton Jones, INVENTOR.
ATTORNEY.

2,500,360

UNITED STATES PATENT OFFICE 2,500,360

PRESSURE RESPONSIVE BELLOWS

Barton Jones, Los Angeles, Calif.

Application September 7, 1948, Serial No. 47,983

2 Claims. (Cl. 137—156.5)

This invention has to do generally with improvements in pressure responsive bellows, for example of the type used in pressure responsive or pressure actuated instruments, and is directed particularly to important advances in the formation of thin metallic bellows composed of a series of circular units, each formed by a pair of spaced sections connected together and to the opposed sections of adjacent units, by fluidtight joints.

Continued sensitivity to small changes in applied fluid pressure, is of course among the prime requisites for an instrument bellows to be capable of precision control. The sensitivity of a bellows may be affected in a general way by such considerations as the overall size, shape and arrangement of its pressure areas, as well as the properties of the material of which the bellows is formed. Ultimate or precise sensitivity is also affected, and heretofore in limiting respects, by the form and condition of the joints interconnecting the bellows sections.

Assuming a bellows unit of given diameter and formed of a material whose properties permit adequately sensitive deflections throughout the area of the unit face, limitations may be imposed upon the practical sensitivity of the unit by the form and condition of the joint between its sections, or of the joint interconnecting adjacent units. Heretofore, the general practice has been to connect the sections with soldered joints, as by placing a fusible ring between marginal flanges of the sections and melting the ring so that the solder films the flange interfaces. Now the inability to exactly control or limit the solder flow customarily results in displacement and deposition of the solder beyond or outside the flange interfaces, and at locations where the bellows metal may have a bend or angular shape adjacent the flange. Ultimate sensitivity however requires that the bellows metal have uninhibited flexibility up to the seal joint, and including the bent or angular portions adjacent the joint. Deposition of soldering or brazing metal beyond the joint interfaces creates the undesirable condition of a limitation and interference with full range flexibility of the bellows metal, and perhaps in a more serious respect creates in the metal a tendency for hysteresis failure of the metal after prolonged flexure at corner or bent locations to which the solder may have become displaced.

My primary object is to avoid the use of soldered or brazed joints, and in so doing to effect a continuous, fluidtight integration of the bellows section flange interfaces by a localized and direct fusion of the flange metal itself. Preferably each unit is formed of a pair of thin metallic sections, e. g., of sheet stainless steel having a thickness within the range of from 0.001 to 0.010, the sections having radially inner and outer marginal and axially projecting flanges brought into overlapping relation for peripheral integration of the sections forming an individual unit, and for integrating successive units. Fluidtight integration of the flanges is effected by passage through the overlapping portions of the flanges of electrical current at sufficient density or intensity to fuse or weld together the flange interfaces and within the marginal boundaries of the flanges so that the bond is correspondingly confined, and to the complete exclusion of any deposition of metal on the bellows surfaces beyond the flanges. Preferably, localized fusions are effected in the form of a close succession of overlapping spot welds resulting from passage of current through the flanges at sufficiently low amperage and within a time interval so short as to prevent excessive fusion of the flange metal. Excellent results have been had using 60 cycle current within the capacity of an 8 k. v. a. generator, with the current flow in forming each spot weld limited to one-half cycle.

The invention further contemplates application to the ends of the bellows of a pair of heads so associated with the inner flanges of the end sections, as to permit attachment of the heads thereto by the same form of fluidtight, spot welded joint.

All the various features and objects of the invention as well as the details of the typical and illustrative embodiment, will be more fully understood from the following detailed description of the accompanying drawing, in which:

Fig. 1 is a view showing the bellows in side elevation;

Fig. 2 is a right end view of Fig. 1;

Fig. 3 is a fragmentary cross section on line 3—3 of Fig. 1; and

Fig. 4 is a fragmentary enlargement of the overlapping section flanges, showing the successive spot welds.

The bellows assembly is shown to comprise a series of circular units 10 each consisting of a pair of thin, typically stainless steel sections 11 and 12, the former having a pair of annular, axially projecting and substantially right angle flanges 13 and 14, and section 12 having similar flanges 15 and 16. Between the flanges, the sections have annular corrugations 17 as illustrated in Fig. 3, the peripheral flanges 13 and 15 of the sections are directly engaged in overlapping relation and joined to form the integrated units 10, and the inner flanges 14 and 16 of adjacent sections are similarly directly engaged in overlapping relation to integrate the series of units.

Fluidtight joints are formed at 18 and 19 between the outer and inner section flanges as a result of controlled fusion and integration of the section metal at the flange interfaces by continually annular series of spot welds 20, see Fig. 4. As previously indicated, the welds are formed by the controlled passage through the overlapping flanges of alternating current controlled within limitations as to time and intensity as to effect fuse surface bonds or welds localized and confined within the transverse dimensions of the flanges. Being located in contiguous or overlapping relation, the welds form a strong and fluidtight joint effectively integrating the flange metals. At this point it may be observed that joining the sections in the described manner affords a highly practicable and otherwise advantageous method of joining the sections, in that the latter can be integrated rapidly and under conditions of precise control, to complete elimination of the relatively time and labor consuming limitations of the conventional soldering practices, and the more frequent failures of soldered joints to afford permanent unions and fluid tight seals.

The present departure in favor of welded joints between the section flanges lends itself conveniently to the attachment of the bellows heads to the end sections. Thus as illustrated in Fig. 3, the bellows is shown to have an inwardly recessed head 22 carrying a threaded tubular fitting 23 and having a peripheral flange 24 engaged against and overlapping the end section flange 16a, the flanges being joined by a spot weld series of the character indicated in Fig. 4. The opposite end of the bellows carries an outwardly recessed head 25 having a central fitting 26 and a peripheral flange 27 secured by a spot weld series to the end section flange 14a.

From the foregoing it will be clear that the localized welds at 18 and 19 are completely confined to the flange interfaces between the flange edges, and that the adjacent surfaces and corners of the bellows sections at the flange corners or bends, not only are free from metal deposits which customarily occur in the formation of soldered or brazed joints, but also are left unaffected by any heating which might otherwise stress or strain the metal, since the welding heat is strictly localized and confined to the integrated flange areas.

I claim:

1. A flexible bellows comprising a series of joined units individualy consisting of a pair of spaced circular metallic sections having outer peripheral annular and axially projecting flanges in directly contacting and overlapping relation, the adjacent sections of adjacent units having a pair of radially inner axially projecting and overlapping flanges, the flanges of each of said pairs being joined throughout their circular extents by fused fluidtight integration of the flange metals localized at their contacting surfaces, the sections at the opposite ends of said series of joined units having axially and outwardly projecting end flanges of a diameter corresponding substantially to the diameter of said overlapping inner flanges of adjacent units, said bellows further including at one end of the unit series an outwardly recessed metallic head having an annular axially extending flange in overlapping relation with said end flange of the corresponding end section, and a second inwardly and conically recessed metallic head at the opposite end of the unit series and having an annular axially projecting flange in overlapping relation with the end flange of the other end section, the head flanges and overlapping section flanges being joined throughout their circular extents by fused fluidtight integration of the head and section flange metals localized at their contacting surfaces.

2. A flexible bellows comprising a series of joined units individually consisting of a pair of spaced circular metallic sections having outer peripheral annular and axially projecting flanges in directly contacting and overlapping relation, the adjacent sections of adjacent units having a pair of radially inner axially projecting and overlapping flanges, the flanges of each of said pairs being joined throughout their circular extents by fused fluidtight integration of the flange metals localized at their contacting surfaces, the sections at the opposite ends of said series of joined units having axially and outwardly projecting end flanges of a diameter corresponding substantially to the diameter of said overlapping inner flanges of adjacent units, said bellows further including at one end of the unit series an outwardly recessed metallic head having an annular axially extending flange in overlapping relation with said end flange of the corresponding end section, and a second inwardly and conically recessed metallic head at the opposite end of the unit series and having an annular axially projecting flange in overlapping relation with the end flange of the other end section, the head flanges and overlapping section flanges being joined throughout their circular extents by fused fluidtight integration of the head and section flange metals localized at their contacting surfaces, all said fluidtight integrations of said flanges being formed by successions of overlapping spot welds confined within the flange widths.

BARTON JONES.

REFERENCES CITED

The following references are of record in the file of this patent:

UNITED STATES PATENTS

| Number | Name | Date |
| --- | --- | --- |
| 1,366,473 | Mallory | Jan. 25, 1921 |
| 2,204,549 | Murch | June 18, 1940 |
| 2,323,985 | Fausek | July 13, 1943 |
| 2,347,185 | Fentress | Apr. 25, 1944 |